United States Patent [19]

Higaki et al.

[11] Patent Number: 4,889,648
[45] Date of Patent: Dec. 26, 1989

[54] COLD-ROLLING OILS FOR STEEL PLATES

[75] Inventors: Yuzo Higaki, Tokyo; Hiroyuki Goto; Keiichi Tanikawa, both of Kanagawa, all of Japan

[73] Assignees: The Nisshin Oil Mills, Ltd.; Nippon Steel Corporation, Tokyo, Japan

[21] Appl. No.: 220,501

[22] Filed: Jul. 18, 1988

Related U.S. Application Data

[63] Continuation-in-part of Ser. No. 39,474, Apr. 16, 1987, abandoned.

[30] Foreign Application Priority Data

Apr. 21, 1986 [JP] Japan .................................. 61-90098
Aug. 26, 1986 [JP] Japan ................................ 61-198109
Sep. 18, 1986 [JP] Japan ................................ 61-218102

[51] Int. Cl.$^4$ .......................................... C10M 105/38
[52] U.S. Cl. .............................. 252/49.5; 252/51.5 A; 252/51.5 R; 72/42
[58] Field of Search ...................... 252/51.5 A, 51.5 R, 252/49.5; 72/42

[56] References Cited

U.S. PATENT DOCUMENTS

| | | | |
|---|---|---|---|
| 3,105,824 | 10/1963 | Green et al. | |
| 3,223,635 | 12/1965 | Dwyer et al. | 252/51.5 A |
| 3,365,397 | 1/1968 | Kolarik | 252/51.5 A |
| 3,374,171 | 1/1968 | Davis | 252/51.5 A |
| 3,542,678 | 11/1970 | Bork | 252/51.5 A |
| 3,637,557 | 1/1972 | Little | |
| 3,897,349 | 7/1975 | Marin et al. | 252/51.5 R |
| 4,243,537 | 1/1981 | Knepp et al. | 252/51.5 A |
| 4,283,293 | 8/1981 | Schick et al. | 252/51.5 R |
| 4,402,839 | 9/1983 | Davis et al. | 252/51.5 A |
| 4,468,339 | 8/1984 | Rysek et al. | 252/49.5 |

FOREIGN PATENT DOCUMENTS

| | | | |
|---|---|---|---|
| 634579 | 1/1962 | Canada | 252/51.5 A |
| 206998 | 12/1986 | European Pat. Off. | |
| 2440531 | 3/1975 | Fed. Rep. of Germany | |
| 2143141 | 2/1973 | France | |
| 51-53168 | 5/1976 | Japan | 252/51.5 A |
| 1593891 | 7/1981 | South Africa | |
| 681555 | 10/1952 | United Kingdom | 252/51.5 A |
| 2024855 | 1/1980 | United Kingdom | |
| 143444 | 6/1985 | United Kingdom | |

OTHER PUBLICATIONS

Chemical Abstracts; 1983 & 1985, pp. 161, 148.

*Primary Examiner*—William R. Dixon, Jr.
*Assistant Examiner*—Jerry D. Johnson
*Attorney, Agent, or Firm*—Kane, Dalsimer, Sullivan, Kurucz, Levy, Eisele and Richard

[57] ABSTRACT

Lubricating oils for rolling of steel plates, which are composed of synthetic ester compounds obtainable from tri- or higher-valent alcohols having tertiary nitrogen such as isocyanuric derivatives or ethylene oxide addition products of ethylenediamine and fatty acids, possess well-balanced rolling lubricating properties and mill cleanability at a high level.

3 Claims, No Drawings

COLD-ROLLING OILS FOR STEEL PLATES

This is a continuation-in-part of copending application Ser. No. 039,474 filed on Apr. 16, 1987, now abandoned.

BACKGROUND OF THE INVENTION

1. Field of the Invention

The present invention relates to a rolling oil having high lubricating properties and high mill cleanability, that is, a cold-rolling oil for steel plates, which excels in lubricating and annealing properties.

2. Brief Description of the Prior Art

Cold-rolling oils used for thin steel plates are generally broken down into two types, one based on animal and vegetable oils and fats (such as tallow and lard, soybean oil, colza oil, palm oil and coconut oil) and the other on mineral oils. Recent demands for energy saving and improvements in productivity lead to higher speed rolling, higher reduction-ratio rolling and mill clean rolling. The rolling oils based on animal and vegetable oils and fats are suitable for high-load and -speed rolling. However, when cold-rolled steel plates are directly annealed without degreasing oily deposits thereon, it is likely that they may be contaminated on their surfaces in the annealing step. That is, such as those described above are suitable in view of lubricating properties, but are unsuitable in view of mill cleanability.

When cold rolling is carried out with the rolling oils based on mineral oils, excellent mill cleanability is achievable, since cold-rolled thin steel plates can be directly annealed without any surface contamination. However, rolling oils based on mineral oils lack in high-load and -speed rolling properties.

In use, oiliness improvers such as animal and vegetable oils and fats, fatty acids (capric, lauric, myristic, stearic, oleic and linolenic acids) or esters (synthetic esters such as monoesters, diesters or polyol esters wherein the alcoholic components are trimethylolpropane, pentaerythritol and 2-ethylhexyl alcohol) as described in "Oil Chemistry", No. 73-11, pages 695-706 are generally added to the rolling oils based on mineral oils so as to enhance their lubricating properties. However, the amount of such improvers added is limited to a narrow range of the required minimum limit so as to retain mill cleanability. As mentioned above, various investigations have been made of cold-rolling oils capable of satisfying high lubricating properties and high mill cleanability at the same time (see for instance Japanese Patent Laid-Open Publication Nos. 56-135600 and 59-80498). However, there are still no oils having both properties in a well-balanced state and at a higher level.

SUMMARY OF THE INVENTION

The present invention provides cold-rolling oils for steel which make a contribution to improvements in productivity as expressed in terms of energy saving and reductions in the number of the steps involved, and which are stable with respect to heat and mechanical shearing occurring at high speeds and pressures and even with respect to chemical reactions such as oxidation, decomposition and polymerization. The cold-rolling oils according to the present invention are easily volatilized off in the annealing step without giving rise to thermally decomposed residues, and combine steel-plate's surface cleanability (mill cleanability) with high lubricating properties.

More specifically, the cold-rolling oils for steel according to the present invention are composed mainly of the esterified products of tri- or higher-valent alcohols selected from amino alcohols having tertiary nitrogen and fatty acids having six or more carbon atoms or a mixture of fatty acid with a rosin compound. The oils have high lubricating properties and high mill cleanability, and make it possible to effectively carry out rolling of thin steel plates and annealing of the steel plates without degreasing the same.

DETAILED DESCRIPTION OF THE INVENTION

The synthetic esters referred to in this disclosure are "molecularly designed" and synthesized to this end. In recent years, synthetic esters have been employed as base oils of, or additives for, rolling oils. However, most of the synthetic esters used as cold-rolling oils are often selected from existing synthetic esters employed as engine oils, hydraulic working oils or other lubricant. Thus, they fail to meet satisfactorily both high lubricating properties and high mill cleanability.

The synthetic esters employed according to the present intenvion have the properties suitable for cold-rolling oils, i.e., they combine high lubricating properties with high mill cleanability, and are "molecularly designed", as mentioned below.

For instance, the tri- or higher-valent alcohols having tertiary nitrogen used in the present invention include triethanolamine, triisopropanolamine, N,N-bis(2-hydroxypropyl)-ethanolamine, N,N-bis(2-hydroxyethyl)-isopropanolamine, triethanolamine trisglycoether, triisopropanolamine trisglycoether, tris(2-hydroxyethyl)isocyanurate, N,N,N',N'-tetrakis(2-hydroxyethyl)ethylenediamine, and N,N,N',N'-tetrakis(2-hydroxypropyl)ethylenediamine.

In accordance with the present invention, particularly preferable tri- or higher-valent alcohols having tertiary nitrogen are isocyanuric derivatives expressed in terms of the general formula (A) to be given later or polyvalent alcohols expressed in terms of the general formula (B) to be given later, wherein the mother nucleus is formed by an alkylene (or phenyl or cyclohexyl) diamine that is a tetravalent alcohol.

The fatty acids to be used in the present invention may include straight or branched-chain, saturated or unsaturated and natural or synthetic fatty acids having six or more carbon atoms such as those represented by hexanoic, octanoic, decanoic lauric, myristic, palmitic, stearic, arachinic, behenic, montanic, palmitooleic, oleic, erucic, ricinoleic, hydroxystearic, linoleic, linolenic, isooctylic, isodecanoic, isolauric, isomyristic, isopalmitic, isostearic and isoarchinic acids.

It has been found that, with the esterified products of the specific alcohols and fatty acids having 5 or less carbon atoms, it is impossible to enhance to a sufficient degree the lubricating properties in cold-rolling of steel plates. This is because the present invention is limited to fatty acids having six or more carbon atoms. Although no particular limitation is placed upon the upper-limit number of carbon atoms contained in the fatty acids used, fatty acids having 30 or less carbon atoms are preferred in view of commercial availability and price. The fatty acid of six or more carbon atoms may be, in part, substituted with a rosin compound selected from the group consisting of rosins, disporportionated rosins, hydrogenated rosins and includes, for example, tall rosin, gum rosin and wood rosin. The hydrogenated rosins mean hydrogenation products of these rosins. Also, the disproportionated resins mean reduction products of the main components such as abietic acid and primaric acid like the hydrogenated rosins. Furthermore, the polymerized rosins mean a rosin compound with large molecular weight by chemical binding of two or more molecules of a rosin monomer. The weight ratio of the fatty acid to rosin is preferably within the range of 95:5 to 25:75, more preferably the range of 90:10 to 40:60.

The esterified products employed in the present invention may be synthesized by esterification of the tri- or higher-valent alcohols having tertiary nitrogen and the fatty acids, which may be effected in the presence or absence of catalysts in any conventional manner.

One preferred esterified product employed in the present invention is the ester of the isocyanuric derivatives having the aforesaid general formula (A) and the fatty acids having six or more carbon atoms, that is, the esterified products of the isocyanuric derivatives of the general formula (A) and the fatty acids having six or more carbon atoms, expressed in terms of the following general formula (C):

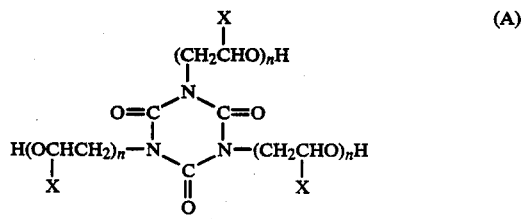

wherein X is H or CH$_3$, and n is an integer of 1 to 10, and

wherein R$_1$ stands for an alkyl, alkenyl, hydroxyalkyl or hydroxyalkenyl group having at least five carbon atoms.

Of the nitrogen-containing polyols (isocyanuric derivatives) having the general formula (A), tris(2-hydroxyethyl)isocyanurate wherein n=1 and X=H is particularly advantageous for the industrial lubricating oils of the present invention, since it is easily commercially available and inexpensive.

No particular limitation is imposed upon the degree of esterification with the fatty acid. It is desired, however, that one mole of tris(2-hydroxyethyl)isocyanurate be esterified with preferably at least 1.5 moles, more preferably at least 2 moles of the fatty acid on the average.

In the nitrogen-containing polyols (isocyanuric derivatives) of the general formula (A), n should preferably be an integer of 1 to 10. It is to be noted, however, that the number n is defined in terms of an averaged number of moles. In some cases, the averaged number of 3 may include 4, since there is then a distribution in the number of addition moles of ethylene or propylene oxide. That is, n is strictly an averaged number which should preferably be not more than 10 in the present invention. If n exceeds 10, the lubricating properties to be achieved then deteriorates.

In general, an increased n allows hydrophilic nature to be afforded to lubricants per se, which then acquire self-emulsifiability or dispersibility.

Another preferred esterified product employed in the present invention are the esters of the tetra-valent alcohols of the aforesaid general formula (B) and the fatty acids having six or more carbon atoms, that is, the esterified products of the nitrogen-containing polyols of the general formula (B) and the fatty acids having six or more carbon atoms, expressed by the general formula (C).

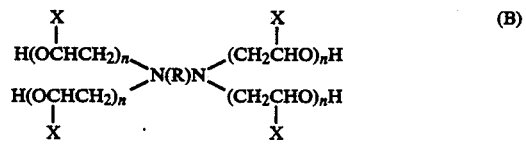

wherein X is H or CH$_3$, n indicates an integer of 1 to 10, and R$_2$ stands for an alkyl, having 2 to 6 carbon atoms, phenyl or a cyclohexyl group, and

The nitrogen-containing polyols of the general formula (A) may be obtained by adding the predetermined amount of ethylene or propylene oxide to ethylenediamine, hexylenediamine, phenyldiamine, cyclohexyldiamine and the like. In particular N,N,N',N'-tetrakis(2-hydroxypropyl)ethylenediamine, wherein R$_2$=C$_2$H$_4$, n=1 and X=CH$_3$, is advantageous for the industrial lubricating oils of the present invention in view of commercial availability and price.

No particular limitation is imposed upon the degree of esterification with the fatty acid. It is desired, however, that one mole of N,N,N',N'-tetrakis(2-hydroxypropyl)ethylenediamine be esterified with preferably at least 2 moles, more preferably at least 3 moles of the fatty acid on the average.

It is to be understood that the reasons why the polyols are limited to ethylene or propylene oxide addition products are that higher alkylene oxide addition products such as butylene oxide addition products are so commercially expensive that difficulty is experienced in obtaining them.

In the nitrogen-containing polyols of the general formula (B), n should preferably be an integer of 1 to 10. Polyols, wherein n is more than 10, have an increased molecular weight and decreases in lubricating properties with an increase in the number of ether bonds. It is to be noted, however, that the number n is defined in terms of an averaged number of moles. In some cases, the averaged number of 3 may include 4, since there may then a distribution in the number of addition moles of ethylene or propylene oxide. In short, n is strictly an averaged number which should preferably be not more than 10 in the present invention. If n exceeds 10, the lubricating properties to be achieved then deteriorates.

In general, an increased n allows hydrophilic nature to be afforded to lubricants per se, which then acquire self-emulsifiability or dispersibility.

The nitrogen-containing polyols, which are the starting material for synthesizing the esterified products of the present invention, are tetra-valent alcohols, and the esterified products thereof with the fatty acids are obtained in the form of monoesters, diesters, triesters or tetraesters. However, the esterified products in the form of di- or higher-esters are more preferable on the average for the cold-rolling oils for steel plates according to the present invention.

The synthetic esters of the present invention may be used as the rolling oils alone or in admixture with other base oils such as mineral oil or animal and vegetable oils and fats. Further, they may be used in the form of an emulsion obtained by adding an emulsifying agent thereto.

In addition, the synthetic esters of the present invention may be used in combination with emulsifying agents, fatty acids, antioxidants and corrosion inhibitors ordinarily used as additives with mineral oils or animal and vegetable oils and fats or practical rolling oils which are usually used as the base oils.

When the synthetic ester compounds of the present invention are used in admixture with other base oils, stable properties are achievable by addition thereof in an amount of at least 5 weight percent, preferably at least 20 weight percent, although they are effective in an amount of as small as 1 weight percent.

EXAMPLES

In what follows, the synthesis examples and examples of the present invention will be given for the purpose of illustration alone.

Synthesis Example 1

Into a four-necked flask having a stirrer, a thermometer, a nitrogen gas-feed tube and a water separator, 522 g (2 moles) of tris(2-hydroxyethyl)isocyanurate and 1269 g (5.85 moles) of coconut oil fatty acid were charged together, and xylene was added as a reflux solvent in an amount of 5% of the starting materials. The mixture was well agitated and allowed to react at 160° to 230° C. in the absence of any catalyst until the calculated amount of water was distilled out. The required time was 9 hours. After the completion of the reaction, xylene was distilled off under reduced pressure, followed by decoloring and filtration with activated clay, thereby to obtain a yellow liquid. The yield and acid number were 1661 g and 1.8, respectively. In similar procedures, a number of synthetic esters were prepared. The properties of the obtained synthetic esters are also set forth in Table 1.

Examples 1-7

Estimation was made of the lubricating and annealing properties of the rolling oil compositions obtained by adding to mineral and palm oils used as the base oils for practical rolling oils ordinarily used additives such as emulsifying agents, fatty acids and antioxidants, and the synthetic esters that were the rolling oils of the present invention.

To make estimation of the rolling lubricating properties of each rolled material under test (spcc) of 1.2×20×200 mm, emulsion rolling was carried out with a two-stage roll type rolling mill at an oil concentration of 3% and bath temperature of 50° C., and a rolling load was then measured at a reduction ratio of 40%. To make estimation of the annealing properties of each sample, several tens steel plates rolled with the emulsion liquid under test were formed as such into a stack, which was then fixed in place with a narrow steel belt, followed by annealing in an annealing furnace of a small size.

Referring to the heating conditions for annealing, the stack was heated in an atmosphere of 120 ml/min of NHX gas ($H_2$: 5%) to 600° C. at a heating rate of 10° C./min, retained at that temperature for 1 hours, and was allowed to stand for cooling.

Thereafter, a cellophane tape was applied over the surface of each steel plate to gather surface deposits, and was sticked over white paper to visually observe the degree of contamination and thereby make estimation of the surface cleanability thereof. The results of testing are set forth in Table 2, wherein the marks are the same as those in Table 1.

TABLE 1

| Sample Marks | Types of Synthetic Esters | | | | Properties of Synthetic Esters | |
|---|---|---|---|---|---|---|
| | Fatty Acids | Molar Ratio | Types of Nitrogen-Containing Polyols | | Acid Value | Hydroxyl Value |
| | | | X | n | | |
| $A_1$ | Coconut oil Fatty acid | 3 | H | 1 | 1.8 | 7 |
| $B_1$ | 2-ethylhexanoic acid | 3 | H | 1 | 1.2 | 4 |
| $C_1$ | Tallow fatty acid | 3 | H | 1 | 2.1 | 15 |
| $D_1$ | Isostearic acid[1] | 3 | H | 1 | 2.3 | 11 |
| $E_1$ | Hardened fish oil fatty acid[2] | 2.5 | H | 1 | 1.5 | 33 |
| $F_1$ | Tall oil fatty acid | 3 | H | 1 | 1.9 | 10 |
| $G_1$ | Crude methyl-branched, mixed fatty acid[3] | 2 | H | 1 | 0.7 | 61 |
| $H_1$ | Tallow fatty acid | 1.5 | H | 1 | 0.9 | 117 |
| $I_1$ | Isostearic acid | 1.5 | H | 1 | 1.1 | 113 |
| $J_1$ | Tally fatty acid | 1.0 | H | 1 | 0.5 | 201 |
| $K_1$ | Tallow fatty acid | 3 | $CH_3$ | 1 | 1.9 | 9 |
| $L_1$ | Coconut oil fatty acid | 3 | H | 3 | 2.5 | 12 |
| $M_1$ | Isostearic acid[1] | 2 | $CH_3$ | 8 | 3.5 | 28 |

[1]Emersol 875 manufactured by Emery
[2]Hydrogenated, refined fish oil fatty acid
[3]Mixed fatty acid containing methyl-branched fatty acid formed as by-product, when preparing dimer acid from tall oil fatty acid (SV 173, IV 70)

TABLE 2

| | | EMULSION[5] | | | | | | | | |
|---|---|---|---|---|---|---|---|---|---|---|
| | | Comp. Ex. | | Example | | | | | | |
| | | 1 | 2 | 1 | 2 | 3 | 4 | 5 | 6 | 7 |
| | Synthetic ester | — | — | $A_1$ 45 | $C_1$ 45 | $D_1$ 45 | $F_1$ 45 | $G_1$ 45 | $H_1$ 45 | $I_1$[6] 45 |
| Composition of rolling oil in weight % | Mineral oil | 55 | 65 | 49 | 50 | 49 | 49 | 49 | 50 | 48.5 |
| | Palm oil | 40 | 25 | — | — | — | — | — | — | 7 |
| | Stearic acid | 2 | 7 | 2 | 2 | 2.5 | 2 | 3 | 2.5 | 2 |
| | Antioxidant[1] | 1 | 1 | 1 | 1 | 1 | 1 | 1 | 1 | 1 |
| | Emulsifying agent[2] | 2 | 2 | 3 | 2 | 2.5 | 3 | 2 | 1.5 | 1.5 |
| Lubricating properties | Rolling load ratio[3] | 1.00 | 1.03 | 0.98 | 1.00 | 0.97 | 0.97 | 0.92 | 0.95 | 0.93 |
| Surface cleanability in the annealing step[4] | | Δ | ~Δ | ~ | | ~ | | ~ | ~ | ~ |

[1]Antioxidant: 2,6-tert-butylphenol
[2]Emulsifying agent: polyoxyethylenealkylphenyl ether (HLB 11.7)
[3]Rolling load ratio: value based on Comp. Ex. 1
[4]Estimation of surface cleanability:
 : No contamination found
 : Extremely limited contamination found
Δ: Contamination found
X: Increased contamination found
[5]Marks $A_1 \sim I_1$ indicate the same ester components as those shown by the marks in Table 1. The concentration is 45%. The actually used rolling liquid is an emulsion having an oil content of 3%.
[6]The ester shown by $I_1$ has a concentration of 40%.

Synthesis Example 2

Into a four-necked flask having a stirrer, a thermometer, a nitrogen gas-feed tube and a water separator, 292 g of N,N,N',N',-tetrakis(2-hydroxypropyl)ethylenediamine and 840 g of coconut oil fatty acid were charged together with 2.2 g of a catalyst toluensulfonic acid, and xylene was added as a reflux solvent in an amount of 5% of the starting materials. The mixture was well agitated and allowed to react at 160° to 230° C. until the calculated amount of water was distilled out. The required time was 8 hours. After the completion of the reaction, the reaction product was washed with water for removal of the catalyst, and xylene was distilled off under reduced pressure, followed by decoloring and filtration with activated clay, thereby to obtain a yellow liquid. The yield and acid number were 970 g and 2.3, respectively (Sample A). In similar procedures, a number of synthetic esters were prepared. The properties of the obtained synthetic esters are also set forth in Table 3.

TABLE 3

| Sample Marks | Type of Polyols | | | Fatty Acids | | General Properties of Esters | |
|---|---|---|---|---|---|---|---|
| | X | n | $R_2$ | Type | Number of Moles | Acid Value | Hydroxyl Value |
| $A_2$ | $CH_3$ | 1 | $(CH_2)_2$ | Coconut oil fatty acid | 4 | 2.3 | 8 |
| $B_2$ | $CH_3$ | 1 | $(CH_2)_2$ | Isostearic acid[(1)] | 2 | 0.5 | 121 |
| $C_2$ | $CH_3$ | 3 | $(CH_2)_2$ | Tallow fatty acid | 3 | 0.7 | 37 |
| $D_2$ | $CH_3$ | 3 | $(CH_2)_2$ | Hardened fish oil fatty acid[(2)] | 2.5 | 0.6 | 54 |
| $E_2$ | H | 1 | $(CH_2)_2$ | Isooctylic acid | 4 | 1.1 | 6 |
| $F_2$ | H | 1 | $(CH_2)_2$ | Tall oil fatty acid | 3 | 0.5 | 51 |
| $G_2$ | H | 2 | $(CH_2)_2$ | Isostearic acid[(1)] | 3.5 | 0.5 | 15 |
| $H_2$ | H | 1 | $(CH_2)_2$ | Tallow fatty acid | 1.5 | 0.4 | 201 |
| $I_2$ | $CH_3$ | 1 | $(CH_2)_6$ | Lanolin fatty acid | 3 | 2.5 | 33 |
| $J_2$ | H | 1 | (phenyl ring) | Coconut oil fatty acid | 3.5 | 1.1 | 18 |
| $K_2$ | $CH_3$ | 10 | $(CH_2)_2$ | Isostearic Acid | 3.5 | 1.8 | 9 |

[(1)]Emersol 871 manufactured by Emery
[(2)]Hydrogenated, refined fish oil fatty acid

Examples 8–13

Estimation was made of the lubricating and annealing properties of the rolling oil compositions obtained by adding to mineral and palm oils used as the base oils for practical rolling oils ordinarily used additives such as emulsifying agents, fatty acids and antioxidants, and the synthetic esters that were the rolling oils of the present invention.

To make estimation of the rolling lubricating properties of each rolled material under test (spcc) of 1.2×20×200 mm, emulsion rolling was carried out with a two-stage roll type rolling mill at an oil concentration of 3% and a bath temperature of 50° C., and a rolling load was then measured at a reduction ratio of 40%. To make estimation of the annealing properties of each sample, several tens steel plates rolled with the emulsion liquid under test were formed as such into a stack, which was then fixed in place with a narrow steel belt, followed by annealing in an annealing furnace of a small size.

Referring to the heating conditions for annealing, the stack was heated in an atmosphere of 120 ml/min of HNX gas ($H_2$: 5%) to 600° C. at a heating rate of 10° C./min, retained at that temperature for 1 hours, and was allowed to stand for cooling.

Thereafter, a cellophane tape was applied over the surface of each steel plate to gather surface deposits, and was sticked over white paper to visually observe the degree of contamination and thereby make estimation of the surface cleanability thereof. The results of testing are set forth in Table 4, wherein the marks are the same as those in Table 3.

rator there were fed 26/g of tris-(2-hydroxyethyl) isocyanurate, 450 g of isostearic acid (#871 by Emery Company) and 380 g of a disproportionated rosin (Bandis G100, the tradename by Harima Kasei Kogyo K. K.) and 2.2 g of phosphoric acid as a catalyst and xylene as a fluxing solvent in the amount of 3% based on the whole feed amount. The mixture was reacted under stirring at temperature of 20° to 260° C. till the predetermined amount of water was distilled out. The necessary time for reaction was 12 hours. After completion of the reaction, the xylene was distilled off under reduced pressure, followed by filtration thereby to obtain a brown viscous liquid (Sample A). Yield: 985 g Acid Value: 7.5.

Similarly, synthetic esters were produced in the same manner as the above.

TABLE 4

| | | EMULSION[5] | | | | | | |
|---|---|---|---|---|---|---|---|---|
| | | Comp. Ex. | Example | | | | | |
| | | 3 | 8 | 9 | 10 | 11 | 12 | 13 |
| | Synthetic ester | — | $A_2$ | $B_2$ | $D_2$ | $E_2$ | $F_2$ | $G_2$ |
| | | | 45 | 45 | 45 | 45 | 45 | 45 |
| Composition | Mineral oil | 55 | 50 | 50 | 50.5 | 50 | 50.0 | 46 |
| of rolling | Palm oil | 40 | — | — | — | — | — | 5 |
| oil in | Palmitic acid | 2 | 2 | 2 | 2 | 2 | 1.5 | 1.5 |
| weight % | Antioxidant[1] | 1 | 1 | 1 | 1 | 1 | 1 | 1 |
| | Emulsifying agent[2] | 2 | 2 | 2 | 1.5 | 2 | 2 | 1.5 |
| Lubricating properties | Rolling load ratio[3] | 1.00 | 0.94 | 0.92 | 0.96 | 0.95 | 0.93 | 0.93 |
| Surface cleanability in[4] the annealing step | | Δ~X | ~ | | ~ | | ~ | ~ |

[1]Antioxidant: 2,6-tert-butyl-4-methylphenol
[2]Emulsifying agent: polyoxyethylenenonylphenyl ether (HLB 11.7)
[3]Rolling load ratio: value based on Comp. Ex. 1
[4]Estimation of surface cleanability:
  : No contamination found
  : Extremely limited contamination found
  Δ: Contamination found
  X: Increased contamination found
[5]The actually used rolling liquid is an emulsion having an oil content of 3%. Marks $A_2$~$G_2$ show the same ester components as those shown by the marks in Table 3.

The results obtained are set forth in Tables 5 and 6.

TABLE 5

| | Synthetic Esters Using Nitrogen-Containing Alcohols of General Formula (A) | | | | | | |
|---|---|---|---|---|---|---|---|
| | Nitrogen-containing Alcohols | | Fatty | | Molar ratio of Alcohol/F. acid/ Rosin (Wt. ratio | Properties of Esters | |
| Sample Marks | x | n | acids | Rosins | of F. acid/Rosin) | Acid Value | Viscosity, cps/50° C. |
| A | H | 1 | Isostearic acid | Disproportionated rosin | 1/1.5/1 (66/34) | 7.5 | 970 |
| B | H | 3 | Tall oil fatty acid | Gum rosin | 1/0.7/1.8 (25/75) | 12.1 | 8850 |
| C | H | 1 | Coconut oil fatty acid | Tall rosin | 1/2/0.06 (95/5) | 3.1 | 290 |
| D | $CH_3$ | 1 | Stearic acid | Disproportionated rosin | 1/1.2/1.2 (44/56) | 6.5 | 1350 |

Synthesis Example 3

Into a four-necked flask provided with a stirrer, a thermometer, a nitrogen gas-feed tube and a water sepa-

TABLE 6

| | Synthetic Esters Using Nitrogen-Containing Alcohol of General Formula (B) | | | | | | | |
|---|---|---|---|---|---|---|---|---|
| | Nitrogen-containing alcohols | | | Fatty | | Molar ratio of Alc./F. acid/Rosin (Wt. ratio of | Properties of Esters | |
| Sample Marks | X | n | R | acids | Rosins | F. acid/Rosin) | Acid Value | Viscosity, cps/50° C. |
| E | H | 1 | $C_2H_4$ | Isooctylic acid | Tall rosin | 1/3/0.5 (70/30) | 3.9 | 620 |
| F | $CH_3$ | 1 | $C_2H_4$ | Isostearic acid | Disproportionated rosin | 1/2/1 (62/38) | 4.4 | 1650 |
| G | $CH_3$ | 3 | $C_2H_4$ | Tallow fatty acid | Hydrogenated gum rosin | 1/1.5/2 (37/63) | 12.9 | 6350 |

TABLE 6-continued

Synthetic Esters Using Nitrogen-Containing Alcohol of General Formula (B)

| Sample Marks | Nitrogen-containing alcohols X | n | R | Fatty acids | Rosins | Molar ratio of Alc./F. acid/Rosin (Wt. ratio of F. acid/Rosin) | Properties of Esters Acid Value | Viscosity, cps/50° C. |
|---|---|---|---|---|---|---|---|---|
| H | $CH_3$ | 1 | $(CH_2)_6$ | Hexanoic acid | Gum rosin | 1/3.2/0.5 (62/38) | 7.5 | 2350 |
| I | H | 3 | $C_2H_4$ | Tall oil fatty acid | Disproportionated rosin | 1/3/0.5 (83/17) | 5.1 | 550 |
| J | H | 10 | $C_2H_4$ | Coconut oil fatty acid | Tall rosin | 1/3.5/0.3 (85/15) | 4.9 | 2150 |
| K | Triethanolamine*[1] | | | Coconut oil fatty acid | Tall rosin | 1/2.5/0.5 (75/25) | 4.9 | 1580 |

*[1]Other aminoalcohol than nitrogen-containing alcohols of general formulae (A) and (B)

Examples 14–19

Using synthetic esters (Sample marks A,C,D,F,G and K) prepared in Synthesis Example 3, rolling oil compositions were prepared in accordance with the formulations as set forth in Table 7.

The lubricating property and annealing property of these rolling oil compositions were tested and rated in the same manner as in Examples 1–7.

The results obtained are set forth in Table 7.

TABLE 7

| | | EMULSION[5] Comp. Ex. 4 | Example 14 | 15 | 16 | 17 | 18 | 19 |
|---|---|---|---|---|---|---|---|---|
| Composition of rolling oil in weight % | Synthetic ester (Sample Marks) | — | A | C | D | F | G | K |
| | | | 45 | 45 | 45 | 45 | 45 | 45 |
| | Mineral oil | 55 | 50 | 50 | 50.5 | 50.5 | 50.5 | 50 |
| | Palm oil | 40 | — | — | — | — | — | — |
| | Palmitic acid | 2.5 | 2 | 2 | 2 | 2 | 2 | 2 (Stearic acid) |
| | Antioxidant[1] | 1 | 1 | 1 | 1 | 1 | 1 | 1 |
| | Emulsifying agent[2] | 1.5 | 2 | 2 | 1.5 | 1.5 | 1.5 | 2 |
| Lubricating Properties | Rolling load ratio[3] | 1.00 | 0.85 | 0.90 | 0.86 | 0.84 | 0.86 | 0.96 |
| | Surface cleanability in[4] the annealing step | x~Δ | ~ | | Δ~ | | Δ~ | ~ |

[1]Antioxidant: 2,6-tert-butyl-4-methylphenol
[2]Emulsifying agent: polyoxyethylenealkylphenyl ether (HLB 11.7)
[3]Rolling load ratio: value based on Comp. Ex. 1
[4]Estimation of surface cleanability:
 : No contamination found
 : Extremely limited contamination found
Δ: Contamination found
x: Increased contamination found
[5]The actually used rolling liquid is an emulsion having an oil content of 3%.

In the present invention, the synthetic ester compounds obtainable from tri- or higher-valent alcohols having tertiary nitrogen such as isocyanuric derivatives or ethylene or propylene oxide addition products of ethylenediamine are intended for use as the rolling lubricants for steel plates, and are "molecularly designed" taking into consideration the requirements to that end. Unlike the existing synthetic esters used as cold-rolling oils or additives, the ester compounds according to the present invention give rise to improvements in the rolling lubricating properties of steel plates, and make a great deal of contribution to energy and material savings such as reductions in the power cost, as compared with the conventional base oils comprising palm oil. In addition, the ester compounds of the present invention excel in mill cleanability, and can dispense with conventional electrolytic degreasing, resulting in reductions in the installation cost.

What is claimed is:

1. In a method of cold-rolling steel plates which comprises applying a cold rolling oil to the plates and cold rolling the oiled plates, the improvement which comprises employing as the cold rolling oil an esterified product of (A) a compound selected from the group consisting of those of the formulae (I)

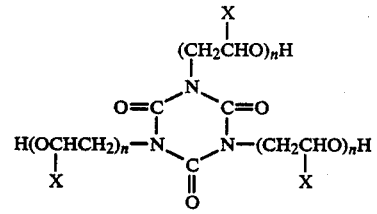

wherein X is H or $CH_3$, and n is an integer of 1 to 10; and (II)

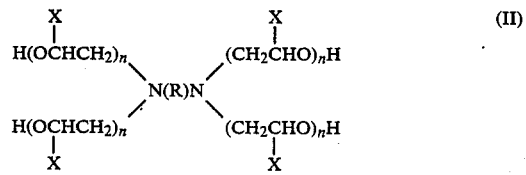

wherein X is H or $CH_3$, n is an integer of 1 to 10, and R is selected from the group consisting of alkyl having 2 to 6 carbon atoms, a phenyl group or a cyclohexyl group; with (B) a fatty acid having six or more carbon atoms or a mixture of said fatty acid with a rosin compound selected from the group consisting of rosin, disproportionated rosin, hydrogenated rosin and polymerized rosin, thereby imparting a rolling lubricating property and mill cleanability to the surface of steel plates.

2. A method of claim 1 wherein the ratio by weight of said fatty acid to rosin compound in component (B) is between 95:5 and 25:75.

3. A method of claim 1 wherein said esterified product is used in the form of emulsion as the cold rolling oil.

* * * * *

UNITED STATES PATENT AND TRADEMARK OFFICE
CERTIFICATE OF CORRECTION

PATENT NO. : 4,889,648

DATED : December 26, 1989

INVENTOR(S) : Yuzo Higaki and Keiichi Tanikawa

It is certified that error appears in the above-identified patent and that said Letters Patent is hereby corrected as shown below:

Columns 7 and 8: Table 2: The columns 1-2 and 1-7 reading across from "Surface cleanability in [4)" should read as follows:

| △ | ○~△ | ◎~○ | ◎ | ◎ | ◎~○ | ◎ | ◎~○ | ◎~○ |
|---|---|---|---|---|---|---|---|---|

No. 4 footnote: before ":No contamination found" insert -- ◎ -- , and before ": Extremely limited contamination found" insert -- ○ -- .

UNITED STATES PATENT AND TRADEMARK OFFICE
CERTIFICATE OF CORRECTION

PATENT NO. : 4,889,648

DATED : December 26, 1989

INVENTOR(S) : Yuzo Higaki and Keiichi Tanikawa

It is certified that error appears in the above-identified patent and that said Letters Patent is hereby corrected as shown below:

Columns 9 and 10: Table 4: The columns 3 and 8-13 reading across from "Surface cleanability in $^{4)}$ should read as follows:

| △~✕ | ◎~○ | ◎ | ◎~○ | ◎ | ◎~○ | ◎~○ |
|---|---|---|---|---|---|---|

No. 4 footnote: before ": No contamination found" insert -- ◎ --, and before ": Extremely limited contamination found" insert -- ○ -- .

UNITED STATES PATENT AND TRADEMARK OFFICE
CERTIFICATE OF CORRECTION

PATENT NO. : 4,889,648

DATED : December 26, 1989

INVENTOR(S) : Yuzo Higaki and Keiichi Tanikawa

It is certified that error appears in the above-identified patent and that said Letters Patent is hereby corrected as shown below:

Columns 11 and 12: Table 7: The columns 4 and 14-19 reading across from "Surface cleanability in$^{4)}$ should read as follows:

| x~Δ | ○ | ○~◎ | Δ~○ | ○ | Δ~○ | ○~◎ |
|---|---|---|---|---|---|---|

No. 4 footnote; before ": No contamination found" insert -- ◎ -- , and before ": Extremely limited contamination found" insert -- ○ -- .

UNITED STATES PATENT AND TRADEMARK OFFICE
CERTIFICATE OF CORRECTION

PATENT NO. : 4,889,648

DATED : December 26, 1989

INVENTOR(S) : Yuzo Higaki and Keiich Tanikawa

It is certified that error appears in the above-identified patent and that said Letters Patent is hereby corrected as shown below:

No. 4 footnote; before ": No contamination found" insert -- ⊚ -- , and before ": Extremely limited contamination found" insert -- ○ -- .

Signed and Sealed this

Twenty-seventh Day of October, 1992

Attest:

DOUGLAS B. COMER

*Attesting Officer*   *Acting Commissioner of Patents and Trademarks*